US011881622B2

(12) United States Patent
Wu et al.

(10) Patent No.: US 11,881,622 B2
(45) Date of Patent: Jan. 23, 2024

(54) ANTENNA ELEMENT WITH FILTERING FUNCTION, FILTERING RADIATION UNIT, AND ANTENNA

(71) Applicant: TONGYU COMMUNICATION INC., Zhongshan (CN)

(72) Inventors: Zhonglin Wu, Zhongshan (CN); Wei Zhao, Zhongshan (CN); Cailong Yue, Zhongshan (CN); Zhenxing Tang, Zhongshan (CN)

(73) Assignee: TONGYU COMMUNICATION INC., Zhongshan (CN)

( * ) Notice: Subject to any disclaimer, the term of this patent is extended or adjusted under 35 U.S.C. 154(b) by 0 days.

(21) Appl. No.: 17/777,213

(22) PCT Filed: Nov. 22, 2019

(86) PCT No.: PCT/CN2019/120096
§ 371 (c)(1),
(2) Date: May 16, 2022

(87) PCT Pub. No.: WO2021/092996
PCT Pub. Date: May 20, 2021

(65) Prior Publication Data

US 2022/0393361 A1 Dec. 8, 2022

(30) Foreign Application Priority Data

Nov. 14, 2019 (CN) .......................... 201911114520.4

(51) Int. Cl.
*H01Q 13/12* (2006.01)
*H01Q 19/10* (2006.01)
(Continued)

(52) U.S. Cl.
CPC ............. *H01Q 13/12* (2013.01); *H01Q 19/10* (2013.01); *H01Q 21/064* (2013.01); *H01Q 21/26* (2013.01)

(58) Field of Classification Search
CPC ...... H01Q 13/12; H01Q 19/10; H01Q 21/064; H01Q 21/26; H01Q 1/521; H01Q 1/36;
(Continued)

(56) References Cited

U.S. PATENT DOCUMENTS

2004/0108967 A1* 6/2004 Fujimura ................. H01Q 1/38 343/702
2016/0329642 A1 11/2016 Chainon et al.

FOREIGN PATENT DOCUMENTS

CN 103730728 A 4/2014
CN 103840254 A * 6/2014 ............. H01Q 1/246
(Continued)

OTHER PUBLICATIONS

Jul. 29, 2020 International Search Report issued in International Patent Application No. PCT/CN2019/120096.
(Continued)

*Primary Examiner* — Hoang V Nguyen
(74) *Attorney, Agent, or Firm* — Oliff PLC

(57) ABSTRACT

An antenna element with a filtering function, a filtering radiation unit, and an antenna. The antenna element is tubular, with a spiral slit arranged around the periphery of the tubular antenna element and extending in an axial direction. The filtering radiation unit includes a support column, and an upper part of the support column is electrically connected to at least one antenna element. The antenna includes a reflecting plate, and at least one filtering radiation unit is fixedly arranged on the reflecting plate. The antenna element with a filtering function has functions of radiating signals and suppressing interference simultaneously. The
(Continued)

filtering radiation unit can cooperate with a high-frequency radiation element during use to achieve the aim of radiating a high-frequency signal and a low-frequency signal simultaneously. The antenna is good in performance, small in size, and high in integration degree.

9 Claims, 3 Drawing Sheets

(51) Int. Cl.
*H01Q 21/06* (2006.01)
*H01Q 21/26* (2006.01)

(58) Field of Classification Search
CPC .......... H01Q 5/42; H01Q 13/10; H01Q 15/14; H01Q 21/062
See application file for complete search history.

(56) References Cited

FOREIGN PATENT DOCUMENTS

| | | | | | |
|---|---|---|---|---|---|
| CN | 108400445 A | | 8/2018 | | |
| CN | 209071594 U | | 7/2019 | | |
| JP | 2004-120168 A | | 4/2004 | | |
| JP | 2005229500 A | * | 8/2005 | .............. | H01Q 5/01 |

OTHER PUBLICATIONS

Jul. 29, 2020 Written Opinion issued in International Patent Application No. PCT/CN2019/120096.

* cited by examiner

ANTENNA ELEMENT WITH FILTERING FUNCTION, FILTERING RADIATION UNIT, AND ANTENNA

TECHNICAL FIELD

The present invention relates to the field of antennas, and specifically, to an antenna element with a filtering function, a filtering radiation unit, and an antenna.

BACKGROUND

With the rapid development of communication, the fifth generation of communication has come. Due to a consideration of operating costs, the 4G+5G mode is going to become the mainstream trend of communication development. However, a 4G antenna and a 5G Massive MIMO antenna are mixed in an array, and a radiation unit of the 4G antenna causes severe interference to a radiation unit of the 5G antenna, which causes beam deformation of the Massive MIMO antenna, so that the coverage is affected and the isolation between systems is not up to standard.

To resolve the foregoing problems, a technical solution commonly used in the prior art is to insert a band-stop filter on an arm of a low-frequency radiation unit, to effectively suppress an induced current generated by a high-frequency electromagnetic wave on the low-frequency radiation unit, thereby greatly weakening an impact of the low-frequency radiation unit on a high-frequency radiation unit. However, several independent filter structures are generally loaded. These filter structures are lumped elements, which introduce discontinuities on arms of oscillators and also affect matching between the oscillators, to cause difficulty in achieving broadband operation and meeting needs of antenna operation.

SUMMARY

A first objective of the present invention is to provide an antenna element with a filtering function, to overcome the existing problem of an insufficient bandwidth due to discontinuities introduced by insertion of a band-stop filter.

To achieve the first objective, a specific solution adopted in the present invention is the antenna element with a filtering function. The antenna element is tubular, and the tubular antenna element is provided with a spiral slit arranged around the periphery of the tubular antenna element and extending in an axial direction.

In a preferable solution, the antenna element is in a shape of a circular tube.

Based on the foregoing antenna element with a filtering function, a second objective of the present invention is to provide a filtering radiation unit that can cooperate with a high-frequency radiation element during use to radiate a high-frequency signal and a low-frequency signal simultaneously.

To achieve the second objective, a specific solution adopted in the present invention is the filtering radiation unit, including a support column. An upper part of the support column is electrically connected to at least one antenna element as described above.

In a preferable solution, the upper part of the support column is electrically connected to at least one element pair, and the element pair includes two antenna elements that are arranged coaxially.

In a preferable solution, the upper part of the support column is electrically connected to two element pairs, and axes of the two element pairs are perpendicular to each other.

Based on the foregoing filtering radiation unit, a third objective of the present invention is to provide an antenna with good performance, small volume, and high integration.

To achieve the third objective, a specific solution adopted in the present invention is the antenna, including a reflecting plate. At least one filtering radiation unit as described above is fixedly arranged on the reflecting plate.

In a preferable solution, several high-frequency radiation units are arranged on a peripheral side of each filtering radiation unit, and the high-frequency radiation units are fixedly arranged on the reflecting plate.

In a preferable solution, the upper part of the support column is electrically connected to at least one element pair, the element pair includes two antenna elements that are arranged coaxially, and one high-frequency radiation unit is arranged laterally below each antenna element.

In a preferable solution, the upper part of the support column is electrically connected to two element pairs, axes of the two element pairs are perpendicular to each other, four high-frequency radiation units are arranged on the peripheral side of each filtering radiation unit, and the four high-frequency radiation units are distributed uniformly.

An effect that the antenna element can achieve is that the spiral slit on the element of the present invention forms a continuous filtering structure, so that a larger bandwidth can be obtained compared with the existing method of inserting a band-stop filter. In addition, suppression of a high-frequency current can be maximized, and interference to a low-frequency current can be minimized, to transmit the low-frequency current forwardly and radiate a low-frequency signal while reversely suppressing a high-frequency induced current, to avoid interference from a high-frequency signal.

An effect that the foregoing filtering radiation unit can achieve is that with a feature that the antenna element conducts the low-frequency current and meanwhile suppresses the interference from the high-frequency current, the filtering radiation unit can be used in conjunction with the high-frequency radiation unit, to radiate the high-frequency signal and the low-frequency signal simultaneously.

An effect that the foregoing antenna can achieve is that the antenna can transmit the low-frequency signal and the high-frequency signal simultaneously, thereby effectively improving the integration of the antenna and reducing the volume of the antenna.

Description of drawings: 1. Slit, 2. Support column, 3. High-frequency radiation unit, and 4. Reflecting plate.

DETAILED DESCRIPTION

The following clearly and completely describes the technical solutions in the embodiments of the present invention with reference to the accompanying drawings in the embodiments of the present invention. Apparently, the described embodiments are merely some embodiments of the present invention rather than all of the embodiments of the present invention. Based on the embodiments of the present invention, all other embodiments obtained by a person of ordinary skill in the art without creative efforts shall fall within the protection scope of the present invention.

Figure 1:
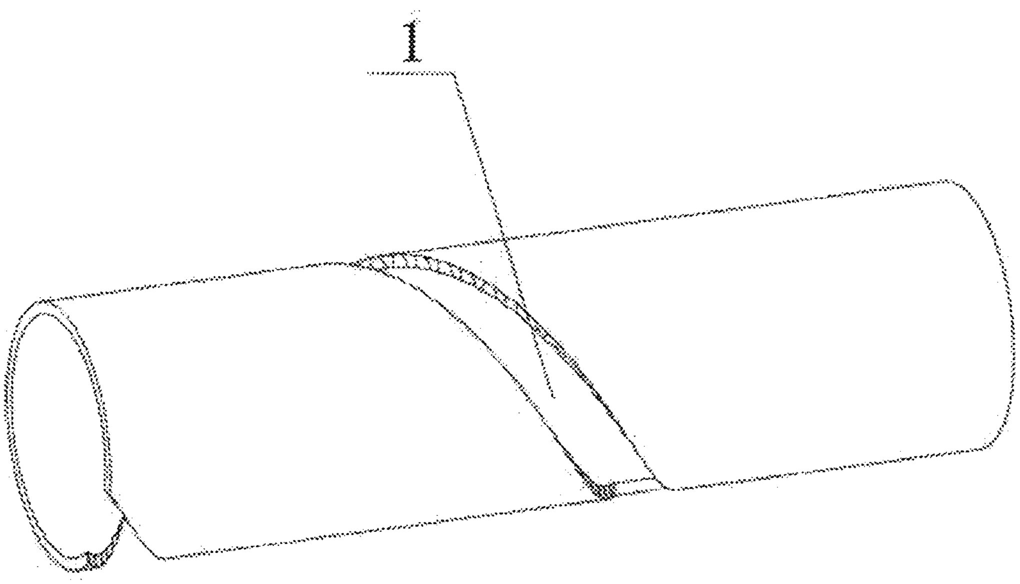
FIG. 1 is a schematic structural diagram of an antenna element.

Referring to FIG. 1, an antenna element with a filtering function is provided. The antenna element is tubular, and the tubular antenna element is provided with a spiral slit 1 arranged around the periphery of the tubular antenna element and extending in an axial direction.

Figure 4:
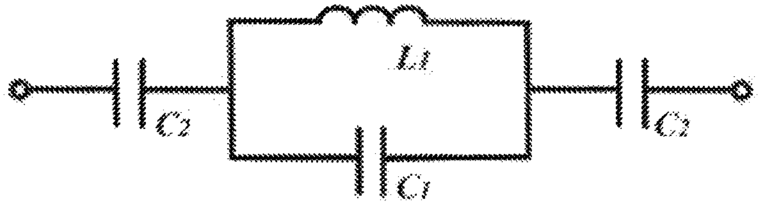
FIG. 4 is an equivalent circuit diagram of an antenna element.

A hollow tube body provided with one round of spiral slit on each section may be equivalent to an LC parallel resonant circuit, as shown in FIG. 4. In addition, the following conditions are met:

$$\begin{cases} j2\pi f_h C_1 + \dfrac{1}{j2\pi f_h L_1} = 0 \\ \dfrac{2}{j2\pi f_l C_2} + \dfrac{1}{j2\pi f_l C_1 + \dfrac{1}{j2\pi f_l L_1}} = 0 \end{cases}$$

where j is an imaginary number, $C_1$ and $C_2$ are equivalent capacitance values, $L_1$ is an equivalent resistance value, $f_h$ is a high-frequency current frequency, and $f_l$ is a low-frequency current frequency.

At a resonant frequency, an antenna element circuit is in an open-circuit state for an external electric field, and an impedance tends to be infinite. In this case, the external electric field does not generate an induced current. When the frequency is much lower than the resonant frequency, a hollow tube body provided with a spiral slit is in a state of low inductive reactance and high capacitive reactance, which has only a small impact on the low-frequency radiation and impedance matching.

Figure 5:
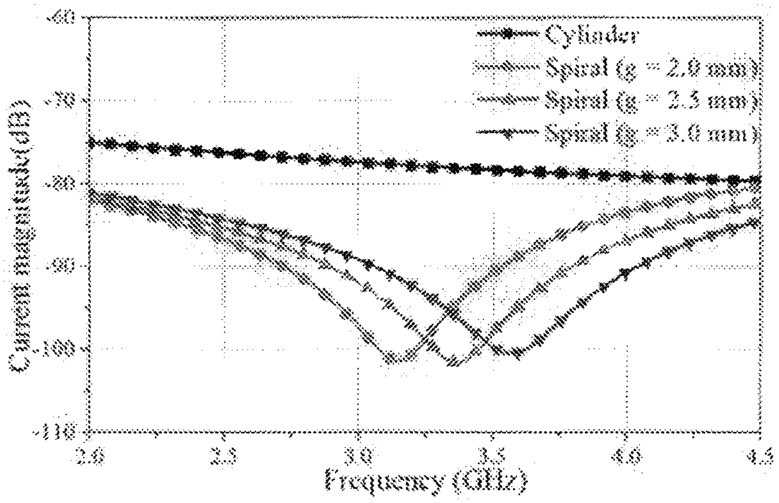
FIG. 5 is a principle diagram of adjusting parameters.

Under the condition of a high-frequency current frequency $f_h$, the antenna element appears as an open circuit, and under the condition of a low-frequency current frequency $f_l$, the antenna element appears as a short circuit. Based on this, an inner diameter of the antenna element is defined as d, a thickness is defined as h, a width of the slit 1 is defined as g, and a distance between two adjacent spirals of the slit 1 is defined as w. By adjusting w, g, and d, suppression of a high-frequency current can be maximized, and interference in a low-frequency current can be minimized, to achieve an effect of transmitting the low-frequency current forwardly and radiating a low-frequency signal while reversely suppressing a high-frequency induced current. In addition, because the slit 1 is spiral, w is fixed, that is, in an effective action area of the antenna element where the slit 1 is located, the antenna element is uniform and continuous, thereby ensuring that the antenna element can obtain a sufficient bandwidth. Further, a relationship between parameters is that g is directly proportional to $C_1$. When g increases, the resonant frequency of the equivalent circuit increases. As shown in FIG. 5, the horizontal coordinate in the figure is the frequency, the vertical coordinate is the intensity of the induced current on a surface of the antenna element, and the black line represents the induced current magnitude on a surface of a circular tube without the spiral slit. It can be seen from the figure that the resonant frequency changes by about 0.2 GHz whenever g changes by 0.5 mm. As d increases, $L_1$ and $C_1$ increase, and then a resonant point moves toward the low-frequency direction. As w increases, $L_1$ decreases, $C_1$ increases slightly, and the resonant point moves toward the high-frequency direction.

In addition, it should be noted that, when w, g, and d are adjusted, overall requirements of the antenna need to be met, or adaptive adjustments are made to the antenna to ensure smooth installation.

Further, the antenna element is in the shape of a circular tube, which can reduce processing difficulty. In other embodiments of the present invention, the antenna element may be set in other shapes, for example, in a shape of a square tube, as long as the size is changed according to an actual needed radiation frequency.

Figure 2:
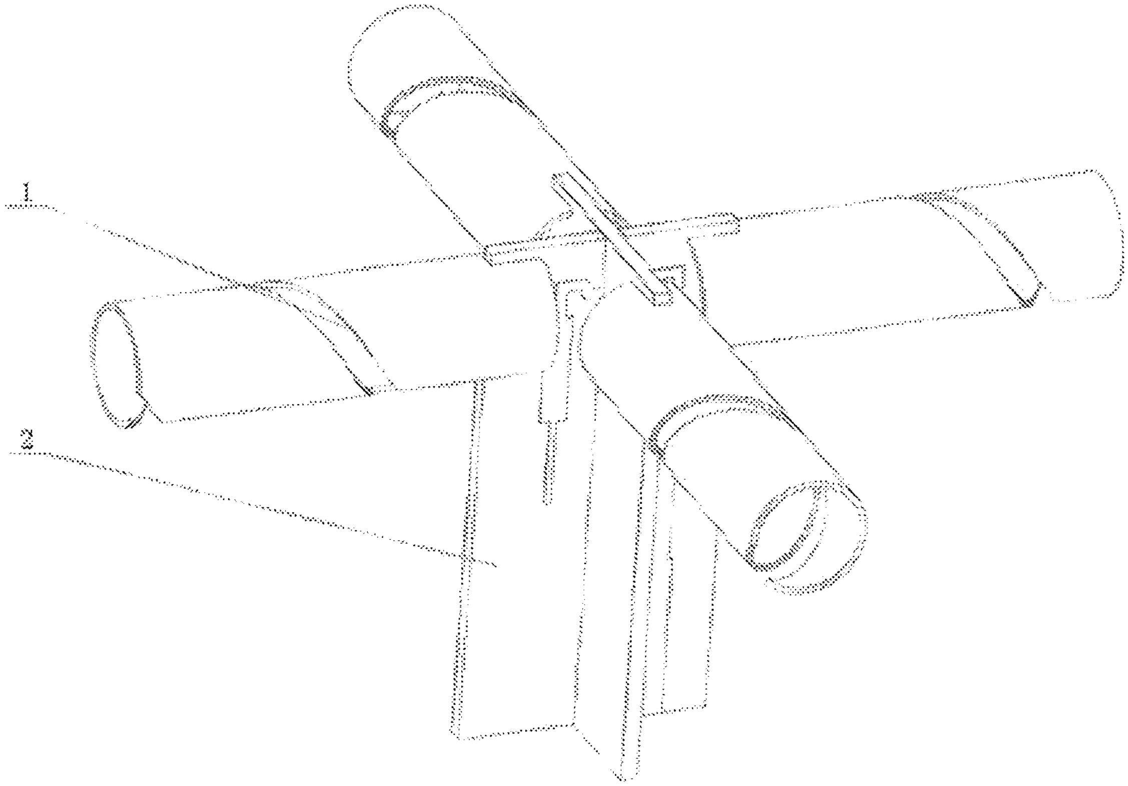
FIG. 2 is a schematic structural diagram of a filtering radiation unit.

Referring to FIG. 2, based on the foregoing antenna element, the present invention further provides a filtering radiation unit, including a support column 2. An upper part of the support column 2 is electrically connected to at least one antenna element as described above.

On one hand, the support column 2 is configured to support the antenna element, to control a distance between reflecting plates 4 of remaining antennas, so that needs of installing other components are met, and on the other hand, the support column is further configured to feed the antenna element. The quantity of antenna elements may be flexibly selected according to an actual use need.

With a feature that the antenna element conducts the low-frequency current and meanwhile suppresses the interference from the high-frequency current, the filtering radiation unit can be used in conjunction with the high-frequency radiation unit, to radiate the high-frequency signal and the low-frequency signal simultaneously. For example, the filtering radiation unit may be configured to radiate a low-frequency 4G signal, and the high-frequency radiation element may be configured to radiate a high-frequency 5G signal. The induced current formed by the 5G signal on the filtering radiation unit is suppressed, thereby preventing the interference of the 4G signal to the 5G signal.

Further, the upper part of the support column 2 is electrically connected to at least one element pair, and the element pair includes two antenna elements that are arranged coaxially.

One element pair is configured to complete a signal transmission task in one polarization direction, and a vertically polarized signal or a horizontally polarized signal may be transmitted according to an actual need. It should be noted that, insulating treatment is needed between two antenna elements. During practical application, a gap may be kept between two composite elements, and then power is fed to the two antenna elements respectively. In this case, the support column 2 may be implemented by a balancer. With the help of the balancer, unbalanced coaxial feeding may be converted into a feature of balanced feeding, and symmetry of a pattern of the filtering radiation unit can be ensured.

Further, the upper part of the support column 2 is electrically connected to two element pairs, and axes of the two element pairs are perpendicular to each other. In this case, the filtering radiation unit may transmit the vertically polarized signal and the horizontally polarized signal simultaneously, to improve signal transmission efficiency.

Figure 3:
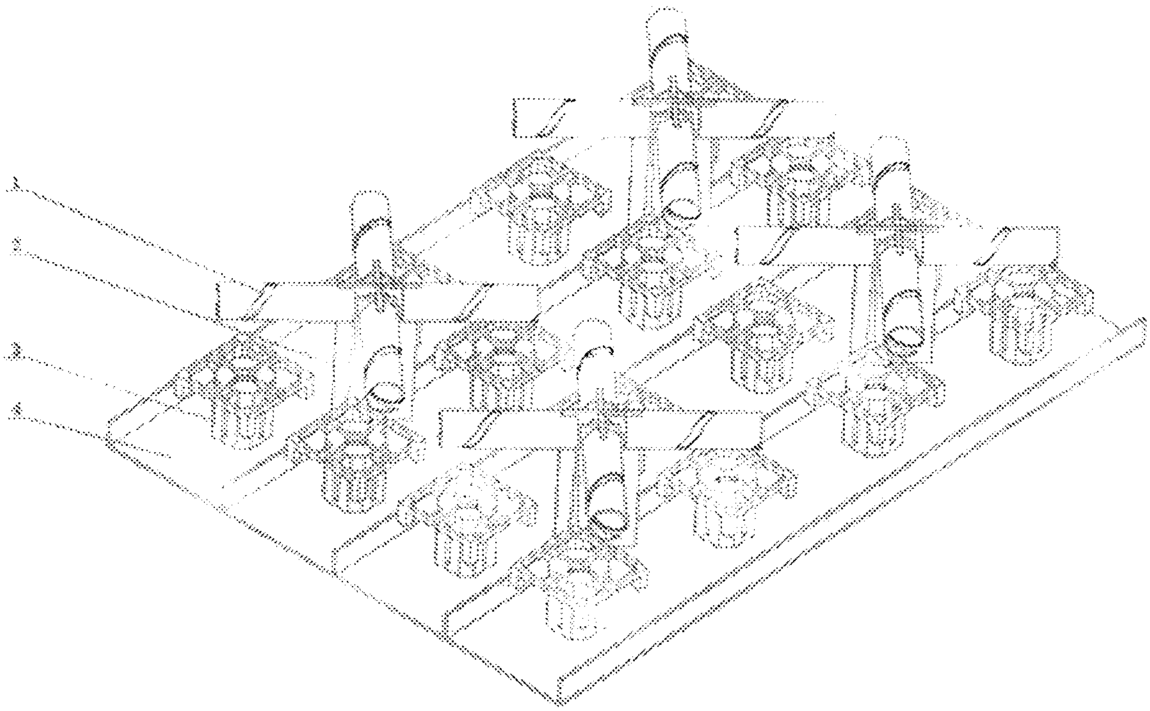
FIG. 3 is a schematic structural diagram of an antenna.

Referring to FIG. 3, based on the foregoing filtering radiation unit, the present invention further provides an antenna, including a reflecting plate 4. At least one filtering radiation unit as described above is fixedly arranged on the reflecting plate 4.

Further, several high-frequency radiation units 3 are arranged on a peripheral side of each filtering radiation unit, and the high-frequency radiation units 3 are fixedly arranged on the reflecting plate 4.

The high-frequency radiation unit 3 is configured to radiate the high-frequency signal. Because the filtering radiation unit may conduct the low-frequency current to radiate the low-frequency signal while suppressing the high-frequency current, to prevent the high-frequency signal from being interfered with by the low-frequency signal, such a combination can transmit the low-frequency signal and the high-frequency signal simultaneously, thereby effectively improving the integration of the antenna and reducing the volume of the antenna. For example, the filtering radiation unit is configured to transmit a low-frequency 4G signal, and a high-frequency radiation unit 3 is configured to transmit a high-frequency 5G signal.

Further, the upper part of the support column 2 is electrically connected to at least one element pair, the element pair includes two antenna elements that are arranged coaxially, and one high-frequency radiation unit 3 is arranged laterally below each antenna element.

Further, the upper part of the support column 2 is electrically connected to two element pairs, axes of the two element pairs are perpendicular to each other, four high-frequency radiation units 3 are arranged on the peripheral side of each filtering radiation unit, and the four high-frequency radiation units 3 are distributed uniformly.

Figure 6:
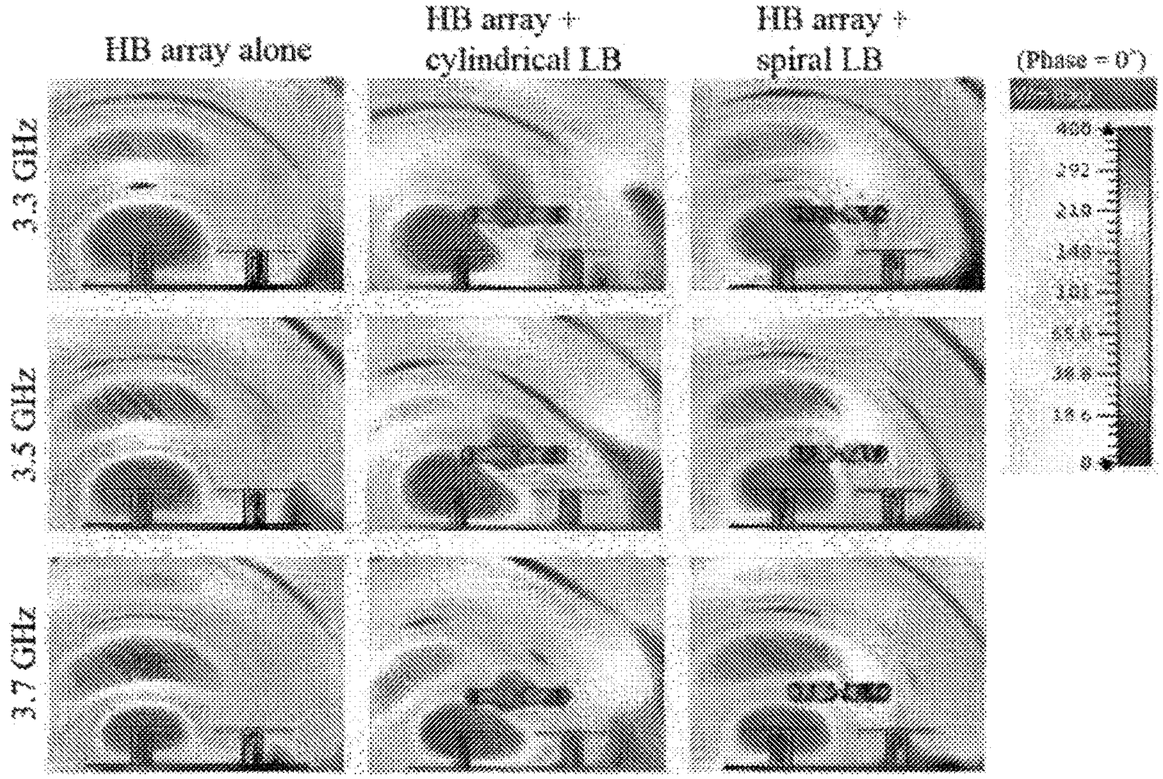
FIG. 6 is a simulation result diagram of an antenna.

All filtering radiation units are arrayed to form a low-frequency antenna, and all high-frequency radiation units 3 are arrayed to form a high-frequency antenna. For example, the low-frequency antenna may be applied as an FDD antenna, and the high-frequency antenna may be applied as a TDD antenna. Therefore, an impact of beams of the FDD antenna on those of the TDD antenna may be effectively weakened, a beam coverage index of the TDD antenna is met, and a port isolation index is greatly improved to realize the FDD+TDD antenna. FIG. 6 is a simulation result diagram of the antenna. The leftmost column is a high-frequency 2D electric field in the absence of any low-frequency oscillator, the middle column is a high-frequency 2D electric field in the presence of an ordinary low-frequency oscillator, and the rightmost column is a high-frequency 2D electric field with a filtering radiation unit in place of an ordinary low-frequency oscillator. It can be seen that the use of the antenna element greatly improves patterns of the antenna, which can meet the beam coverage index of the antenna and improve the port isolation.

The above description of the disclosed embodiments enables a person skilled in the art to implement or use the present invention. Various modifications to these embodiments are obvious to a person skilled in the art, and the general principles defined in this specification may be implemented in other embodiments without departing from the spirit and scope of the present invention. Therefore, the present invention is not intended to be limited to these embodiments illustrated in this specification, but shall be construed in the widest scope consistent with the principles and novel features disclosed in this specification.

What is claimed is:

1. An antenna element comprising:
a hollow tube body; and
a spiral slit arranged around a periphery of the hollow tube body and extending in an axial direction, wherein
the spiral slit forms a continuous filtering structure, and
the hollow tube body having one round of the spiral slit on each section of the hollow tube body is equivalent to an LC parallel resonant circuit.

2. The antenna element according to claim 1, wherein the antenna element is in a shape of a circular tube.

3. A filtering radiation unit comprising:
at least one antenna element comprising:
a hollow tube body; and
a spiral slit arranged around a periphery of hollow tube body and extending in an axial direction, the spiral slit forming a continuous filtering structure; and
a support column, wherein an upper part of the support column is electrically connected to each of the at least one antenna element, wherein
the spiral slit forms a continuous filtering structure, and
the hollow tube body having one round of the spiral slit on each section of the hollow tube body is equivalent to an LC parallel resonant circuit.

4. The filtering radiation unit according to claim 3, wherein
the upper part of the support column is electrically connected to at least one element pair, and
the element pair comprises two antenna elements that are arranged coaxially.

5. The filtering radiation unit according to claim 4, wherein
the upper part of the support column is electrically connected to two element pairs, and
axes of the two element pairs are perpendicular to each other.

6. An antenna comprising:
a reflecting plate,
wherein at least one filtering radiation unit according to claim 3 is fixedly arranged on the reflecting plate.

7. The antenna according to claim 6, wherein
a plurality of high-frequency radiation units are arranged on a peripheral side of each filtering radiation unit, and
the plurality of high-frequency radiation units are fixedly arranged on the reflecting plate.

8. The antenna according to claim 7, wherein
the upper part of the support column is electrically connected to at least one element pair,
the element pair comprises two antenna elements that are arranged coaxially, and
one high-frequency radiation unit is arranged laterally below each antenna element.

9. The antenna according to claim 8, wherein
the upper part of the support column is electrically connected to two element pairs,
axes of the two element pairs are perpendicular to each other,
four high-frequency radiation units are arranged on the peripheral side of each filtering radiation unit, and
the four high-frequency radiation units are distributed uniformly.

* * * * *